(12) United States Patent
Bhatt et al.

(10) Patent No.: US 11,928,013 B2
(45) Date of Patent: Mar. 12, 2024

(54) IMAGE ANALYSIS OF DATA LOGS

(71) Applicant: Nokia Solutions and Networks Oy, Espoo (FI)

(72) Inventors: Rakshesh Pravinchandra Bhatt, Bangalore (IN); Kiran Kumar HK, Karnataka (IN); B Prasanna Sai Krishna, Andhra Pradesh (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/678,368

(22) Filed: Feb. 23, 2022

(65) Prior Publication Data

US 2023/0267027 A1 Aug. 24, 2023

(51) Int. Cl.
*G06F 11/07* (2006.01)
*G06F 11/34* (2006.01)
*G06V 30/14* (2022.01)
*G06V 30/19* (2022.01)

(52) U.S. Cl.
CPC ........ *G06F 11/079* (2013.01); *G06F 11/3476* (2013.01); *G06V 30/14* (2022.01); *G06V 30/19093* (2022.01); *G06V 30/19107* (2022.01)

(58) Field of Classification Search
CPC ............... G06F 11/079; G06F 11/3476; G06V 30/19107; G06V 30/19093; G06V 30/14
See application file for complete search history.

(56) References Cited

U.S. PATENT DOCUMENTS

| 11,163,722 | B2* | 11/2021 | Wang ................ G06F 16/24568 |
| 2011/0185234 | A1 | 7/2011 | Cohen et al. |
| 2017/0236023 | A1 | 8/2017 | Debnath et al. |
| 2019/0034517 | A1 | 1/2019 | Byrd et al. |
| 2019/0095313 | A1 | 3/2019 | Xu et al. |
| 2020/0174870 | A1 | 6/2020 | Xu et al. |
| 2021/0064500 | A1* | 3/2021 | Przestrzelski ......... G06F 11/079 |
| 2022/0294685 | A1* | 9/2022 | Li ........................... G06T 11/00 |

FOREIGN PATENT DOCUMENTS

WO 2021012079 A1 1/2021

OTHER PUBLICATIONS

European Search Report; Application EP23156326; dated Nov. 21, 2023.

* cited by examiner

*Primary Examiner* — Nadeem Iqbal
(74) *Attorney, Agent, or Firm* — Duft & Bornsen, PC

(57) ABSTRACT

Systems, methods, and software for analyzing data logs. In one embodiment, a method comprises collecting a plurality of the data logs from log-generating elements, converting the data logs into log images, performing image analysis on a plurality of the log images to extract insights, and generating an output based on the insights.

20 Claims, 12 Drawing Sheets

| DATA LOG 112 | | | | | |
|---|---|---|---|---|---|
| ID | MODE | TIMESTAMP | LOGLEVEL | COMP | LOGLINE |
| 2f | MDAA | 2021-XX-XX | INF | LTX | LOG DESCRIPT AAA |
| 30 | MDAA | 2021-XX-XX | INF | LTX | LOG DESCRIPT AAB |
| 31 | MDAA | 2021-XX-XX | INF | LTX | LOG DESCRIPT AAC |
| 45 | MDBB | 2021-XX-XX | WRN | RF | LOG DESCRIPT ABD |
| 46 | MDBC | 2021-XX-XX | DBG | RF | LOG DESCRIPT ABE |
| 47 | MDCC | 2021-XX-XX | INF | DPD | LOG DESCRIPT ACF |
| 48 | MDDD | 2021-XX-XX | ERR | DPD | LOG DESCRIPT ACG |
| 49 | MDEE | 2021-XX-XX | INF | LTX | LOG DESCRIPT ADH |
| 4a | MDEF | 2021-XX-XX | INF | LTX | LOG DESCRIPT ADI |
| 4b | MDFF | 2021-XX-XX | WRN | RF | LOG DESCRIPT ADJ |
| 4c | MDGG | 2021-XX-XX | DBG | RF | LOG DESCRIPT AFK |
| 4e | MDGH | 2021-XX-XX | INF | DPD | LOG DESCRIPT AGL |
| 4f | MDHI | 2021-XX-XX | ERR | DPD | LOG DESCRIPT AHM |

*FIG. 5*

| LOG IMAGE 320 | | | | | |
|---|---|---|---|---|---|
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |
| PXL VAL | PXL VAL | PXL VAL | PXL VAL | PXL VAL | PXL VAL |

```
DELIMITED FILE 1100

25, 0935, 865543, 13735, 0555, 36795
28, 0935, 570, 13735, 0555, 36795
37, 0935, 1147, 13735, 0555, 36795
39, 0936, 82, 13736, 0556, 32102
81, 0937, 3453, 13737, 0556, 32506
6d, 0938, 396016, 13735, 0557, 35508
6f, 0939, 10193, 13738, 0557, 35612
b5, 0940, 828246, 13735, 0555, 35620
b9, 0941, 81, 13735, 0555, 35640
d2, 0942, 330488, 13736, 0556, 28200
17, 0943, 612943, 13737, 0556, 22660
2c, 0944, 100234, 13735, 0557, 35200
40, 0945, 100217, 13738, 0557, 29605
                    •
                    •
                    •
```

IMAGE ANALYSIS OF DATA LOGS

TECHNICAL FIELD

This disclosure is related to the field of data logs and, in particular, to analysis of data logs.

BACKGROUND

Troubleshooting typically involves analyzing data logs (referred to also herein as "logs") from various inter-connected elements and devices. Often it is required to compare data logs in order to figure out if the same set of error scenarios have re-occurred. Identifying similar log patterns may help identify similar solutions or workarounds that can be applied. However, troubleshooting a complex system is a challenge as large volumes of data logs need to be analyzed, making manual or semi-automated analysis time-consuming or impractical. Also, a large amount of storage space is needed to store past data logs.

SUMMARY

Described herein are enhanced mechanisms for analyzing data logs. For example, a system as described herein performs preprocessing on the data logs to convert the data logs into digital images, which are referred to herein as log images. The individual log entries of a data log are represented as pixels in a log image having a pixel value. The log images may then be processed using image analysis to extract intelligent inferences from the log images, such as error patterns, anomalies, future problems, etc. Technical benefits include faster troubleshooting, enabling predictive troubleshooting, reduced storage space, and improved data privacy.

One embodiment comprises a method of analyzing data logs. The method comprises collecting a plurality of the data logs from log-generating elements, converting the data logs into log images, performing image analysis on a plurality of the log images to extract insights, and generating an output based on the insights.

In one embodiment, converting the data logs into log images comprises converting a data log into a delimited file where log entries of the data log are separated by delimiters, assigning numeric values to the log entries in the delimited file, and mapping the numeric values for the log entries to pixels in a log image where the numeric values represent pixel values for the pixels.

In one embodiment, converting the data logs into log images further comprises filtering the log entries in the delimited file to mask a subset of the log entries.

In one embodiment, assigning numeric values to the log entries comprises generating clusters of log entries based on training data, and assigning cluster identifiers to the clusters. For a log entry of the log entries, the method further comprises determining a similarity of the log entry to the clusters, and assigning, when a similar cluster is identified from the clusters, a cluster identifier for the similar cluster as the numerical value for the log entry.

In one embodiment, when a similar cluster is not identified from the clusters, the method further comprises creating a new cluster with a new cluster identifier, and assigning the new cluster identifier for the new cluster as the numerical value for the log entry.

In one embodiment, assigning numeric values to the log entries comprises sorting the delimited file based on the log entries of a timestamp field, computing time differences between consecutive log entries of the timestamp field, and assigning the time differences as the numerical values for the log entries of the timestamp field.

In one embodiment, performing image analysis comprises receiving a problem report indicating a problem associated with a target log-generating element, performing image analysis to compare a log image for the target log-generating element with past log images to identify a set of past log images that are similar to the log image, identifying a root cause of a problem associated with the set of past log images, and identifying a solution associated with the problem based on the set of past log images.

In one embodiment, performing image analysis comprises identifying a sequence of past log images for a target log-generating element, performing image analysis on the sequence of past log images to generate a predicted log image for the target log-generating element, identifying a future problem based on the predicted log image, and identifying one or more proactive actions to mitigate the future problem based on the predicted log image.

One embodiment comprises a log analysis system comprising at least one processor and at least one memory including computer program code. The memory and the computer program code are configured to, with the at least one processor, cause the log analysis system at least to collect a plurality of data logs from log-generating elements, convert the data logs into log images, perform image analysis on a plurality of the log images to extract insights, and generate an output based on the insights.

In one embodiment, the processor further causes the log analysis system at least to convert a data log into a delimited file where log entries of the data log are separated by delimiters, assign numeric values to the log entries in the delimited file, and map the numeric values for the log entries to pixels in a log image where the numeric values represent pixel values for the pixels.

In one embodiment, the processor further causes the log analysis system at least to filter the log entries in the delimited file to mask a subset of the log entries.

In one embodiment, the processor further causes the log analysis system at least to generate clusters of log entries based on training data, and assign cluster identifiers to the clusters. For a log entry of the log entries, determine a similarity of the log entry to the clusters, and assign, when a similar cluster is identified from the clusters, a cluster identifier for the similar cluster as the numerical value for the log entry.

In one embodiment, the processor further causes the log analysis system at least to, when a similar cluster is not identified from the clusters, create a new cluster with a new cluster identifier, and assign the new cluster identifier for the new cluster as the numerical value for the log entry.

In one embodiment, the processor further causes the log analysis system at least to sort the delimited file based on the log entries of a timestamp field, compute time differences between consecutive log entries of the timestamp field, and assign the time differences as the numerical values for the log entries of the timestamp field.

In one embodiment, the processor further causes the log analysis system at least to receive a problem report indicating a problem associated with a target log-generating element, perform image analysis to compare a log image for the target log-generating element with past log images to identify a set of past log images that are similar to the log image, identify a root cause of a problem associated with the set of past log images, and identify a solution associated with the problem based on the set of past log images.

In one embodiment, the processor further causes the log analysis system at least to identify a sequence of past log images for a target log-generating element, perform image analysis on the sequence of past log images to generate a predicted log image for the target log-generating element, identify a future problem based on the predicted log image, and identify one or more proactive actions to mitigate the future problem based on the predicted log image.

One embodiment comprises a log analysis system comprising a means for collecting a plurality of data logs from log-generating elements, a means for converting the data logs into log images, a means for performing image analysis on a plurality of the log images to extract insights, and a means for generating an output based on the insights.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 5 illustrates a data log in an illustrative embodiment.

FIG. 6 illustrates a log image translated from a data log in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
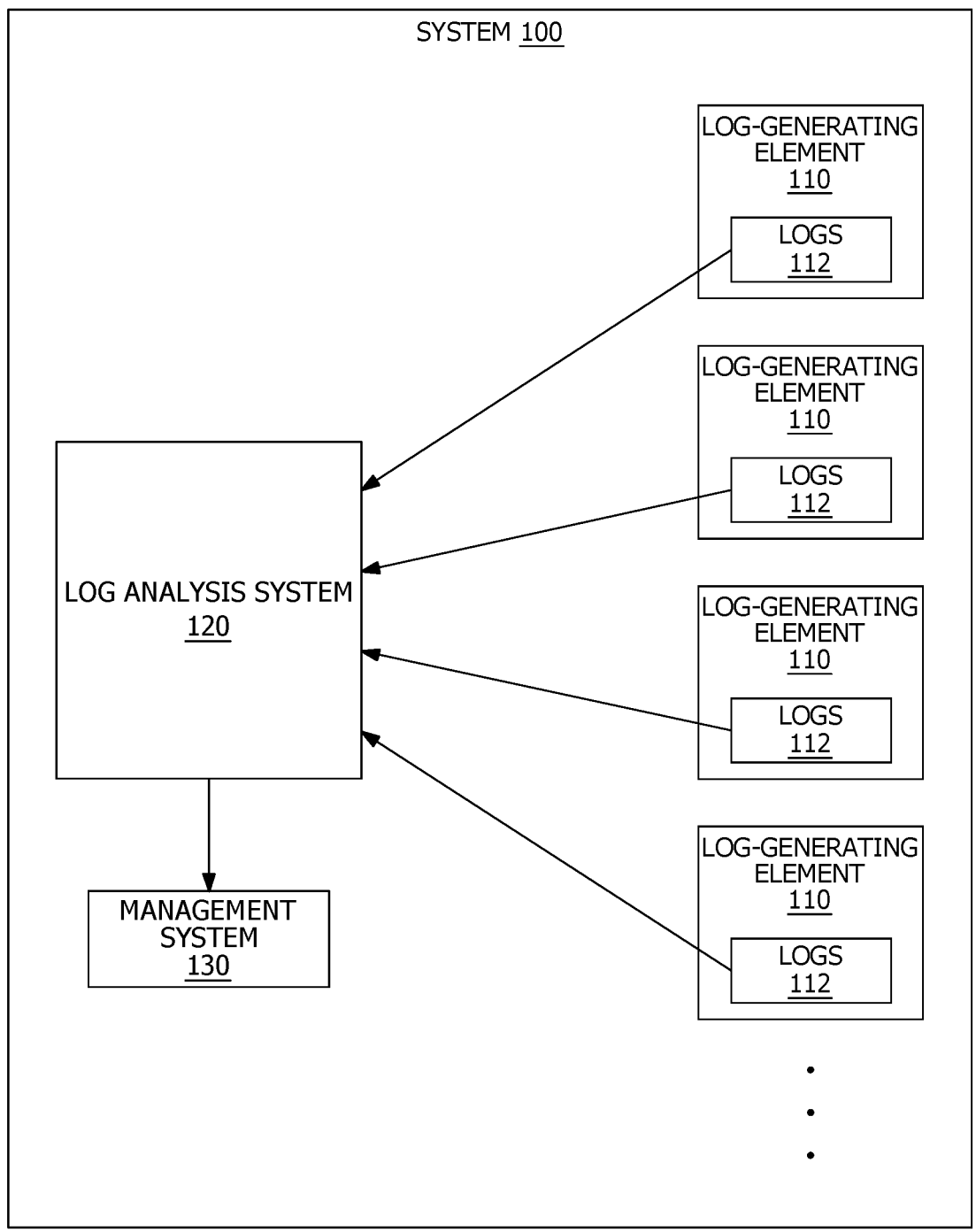
FIG. 1 illustrates a system in an illustrative embodiment.

Embodiments described below set forth an enhanced manner of troubleshooting a system of elements that generate data logs. FIG. 1 illustrates a system 100 in an illustrative embodiment. System 100 may comprise a wireless or mobile telecommunication network, a Radio Access Network (RAN), an operating system, an enterprise system, a cloud-computing system, and/or another type of system. System 100 includes a plurality of log-generating elements 110. A log-generating element 110 comprises an element that performs actions, operations, activities, etc., and generates data logs 112 or a log file. For example, a log-generating element 110 may comprise a network element, a processing element, a hardware element, a server, a component, a device, a software module, an application, etc. A data log 112 (or log file) comprises a data file that includes information about performance, usage patterns, events, activities, operations, transactions, and/or other information. It may be assumed in these embodiments that data logs 112 generated by log-generating elements 110 are text-based.

System 100 further includes a log analysis system 120 and a management system 130. Log analysis system 120 is a troubleshooting system configured to perform log collection, analysis, reporting, etc. For example, log analysis system 120 is configured to collect data logs 112 from one or more log-generating elements 110 within system 100, and/or other log-generating elements 110 outside of system 100. Log analysis system 120 is further configured to analyze the data logs 112 to extract or derive inferences from the data logs 112. Management system 130 is a system configured to perform fault management, configuration management, performance management, etc., of log-generating elements 110, such as based on output from log analysis system 120.

Figure 2:
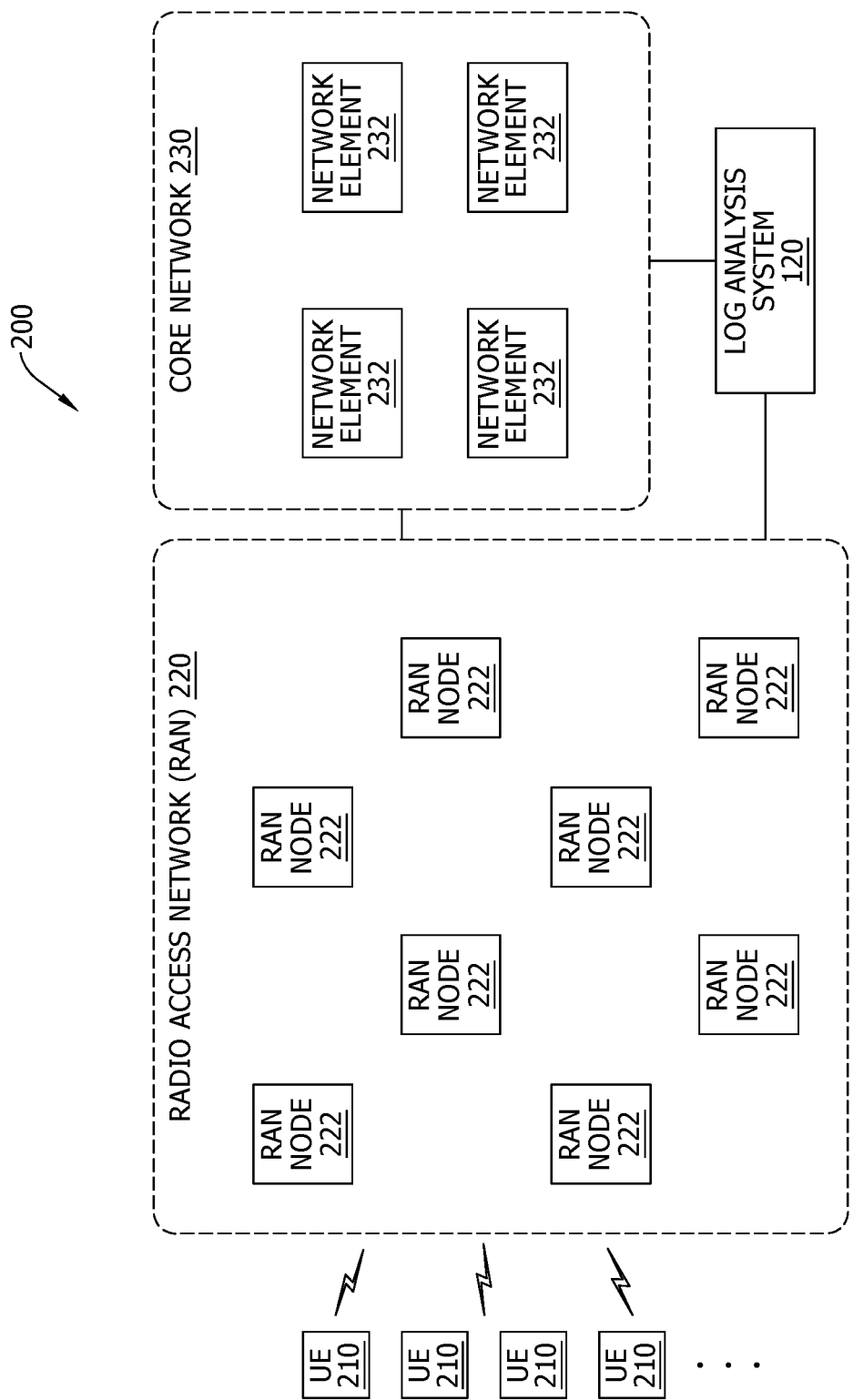
FIG. 2 illustrates a telecommunication system in an illustrative embodiment.

One example of system 100 is a telecommunication system. FIG. 2 illustrates a telecommunication system 200 in an illustrative embodiment. Telecommunication system 200 is a cellular network or mobile network where the last link is wireless, and provides voice and/or data services to a plurality of devices. Telecommunication system 200 may be a Fourth Generation (4G) network (e.g., a Long Term Evolution (LTE) network), a next-generation network (e.g., 5G or later), or another type of network. Telecommunication system 200 is illustrated as providing communication services to User Equipment (UE) 210. UEs 210 may be enabled for voice services, data services, Machine-to-Machine (M2M) or Machine Type Communications (MTC) services, and/or other services. A UE 210 may be an end user device such as a mobile phone (e.g., smart phone), a tablet or PDA, a computer with a mobile broadband adapter, etc.

Telecommunication system 200 includes one or more Radio Access Networks (RAN) 220 that communicate with UEs 210 over a radio interface. RAN 220 may support Evolved-UMTS Terrestrial Radio Access Network (E-UTRAN) access, Wireless Local Area Network (WLAN) access, new Radio Access Technologies (RAT), etc. As an example, RAN 220 may comprise an E-UTRAN or Next Generation RAN (NG-RAN). RAN 220 includes a plurality of RAN nodes 222, such as base stations that are dispersed over a geographic area. A base station comprises an entity that uses radio communication technology to communicate with a UE 210, and interface the UE 210 with a core network 230. In one embodiment, one or more of the base stations may comprise an Evolved-NodeB (eNodeB or eNB) of an E-UTRAN. In one embodiment, one or more of the base stations may comprise a gNodeB (NR base stations) and/or ng-eNodeB (LTE base stations supporting a 5G Core Network) of an NG-RAN.

Core network 230 is the central part of telecommunication system 200 that provides various services to customers who are connected by RAN 220. One example of core network 230 is the Evolved Packet Core (EPC) network as suggested by the 3GPP for LTE. Another example of core network 230 is a 5G core network as suggested by the 3GPP. Core network 230 includes network elements 232, which may comprise servers, devices, apparatus, or equipment (including hardware) that provide services for UEs 210. Network elements 232, in an EPC network, may comprise a Mobility Management Entity (MME), a Serving Gateway (S-GW), a Packet Data Network Gateway (P-GW), etc. Network elements 232, in a 5G network, may comprise an Access and Mobility Management Function (AMF), a Session Management Function (SMF), a Policy Control Function (PCF), an Application Function (AF), a User Plane Function (UPF), etc.

RAN nodes 222 and/or network elements 232 are examples of log-generating elements 110 within telecommunication system 200. RAN nodes 222 and/or network elements 232 may therefore generate data logs 112, which are collected by log analysis system 120.

Although telecommunication system 200 was shown as one example of system 100, other types of systems are considered herein.

Figure 3:
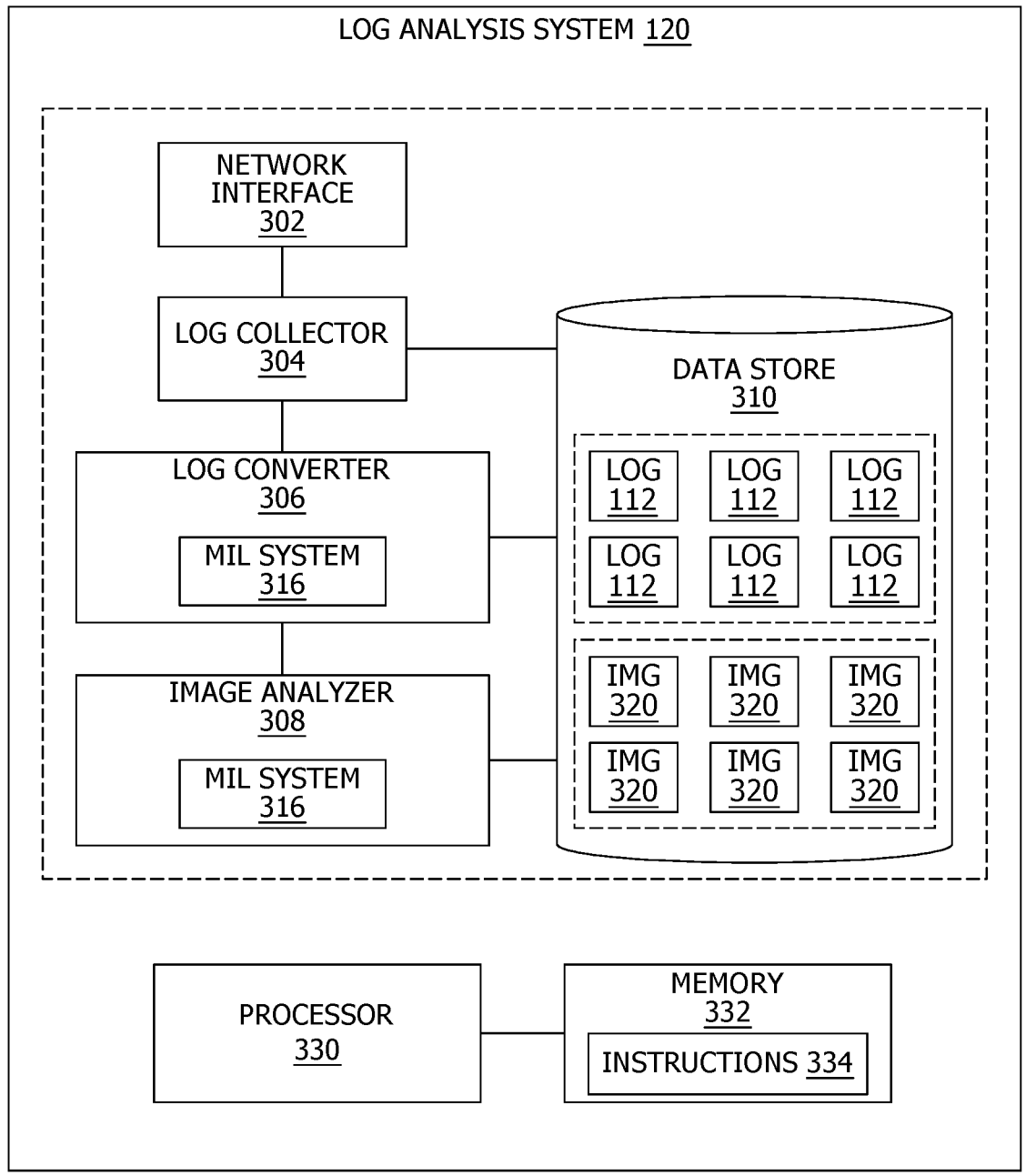
FIG. 3 is a block diagram of a log analysis system in an illustrative embodiment.

FIG. 3 is a block diagram of log analysis system 120 in an illustrative embodiment. In this embodiment, log analysis system 120 includes the following subsystems: a network interface component 302, a log collector 304, a log converter 306, an image analyzer 308, and a data store 310. Network interface component 302 is a hardware component or circuitry that exchanges messages, packets, data, etc., with other elements over a network connection. Network interface component 302 may use a variety of protocols or reference points for communication. Log collector 304 comprises circuitry, logic, hardware, means, etc., configured to collect data logs 112 from log-generating elements 110, such as through network interface component 302. Log converter 306 comprises circuitry, logic, hardware, means, etc., configured to convert or translate data logs 112, which are text-based, into log images (IMG) 320. Image analyzer 308 comprises circuitry, logic, hardware, means, etc., configured to analyze log images 320, which are converted from the data logs 112. Data store 310 comprises a repository for persistently storing and managing data logs 112, log images 320, and/or other collections of data.

In one embodiment, log converter 306, image analyzer 308, and/or other subsystems of log analysis system 120 may implement a machine learning (ML) system 316. An ML system 316 may comprise circuitry, logic, hardware, software, means, etc., configured to use machine learning techniques to perform functions, such as converting text-based logs into log images 320, analyzing log images 320 to identify similarities or dissimilarities between the log images 320, detecting patterns in the log images 320, detecting anomalies in the log images 320, making predictions based on the log images 320, and/or performing other functions.

One or more of the subsystems of log analysis system 120 may be implemented on a hardware platform comprised of analog and/or digital circuitry. One or more of the subsystems of log analysis system 120 may be implemented on a processor 330 that executes instructions 334 stored in memory 332. A processor 330 comprises an integrated hardware circuit configured to execute instructions 334 to provide the functions of log analysis system 120. Processor 330 may comprise a set of one or more processors or may comprise a multi-processor core, depending on the particular implementation. Memory 332 is a non-transitory computer readable medium for data, instructions, applications, etc., and is accessible by processor 330. Memory 332 is a hardware storage device capable of storing information on a temporary basis and/or a permanent basis. Memory 332 may comprise a random-access memory, or any other volatile or non-volatile storage device.

Log analysis system 120 may include various other components not specifically illustrated in FIG. 3.

Figure 4:
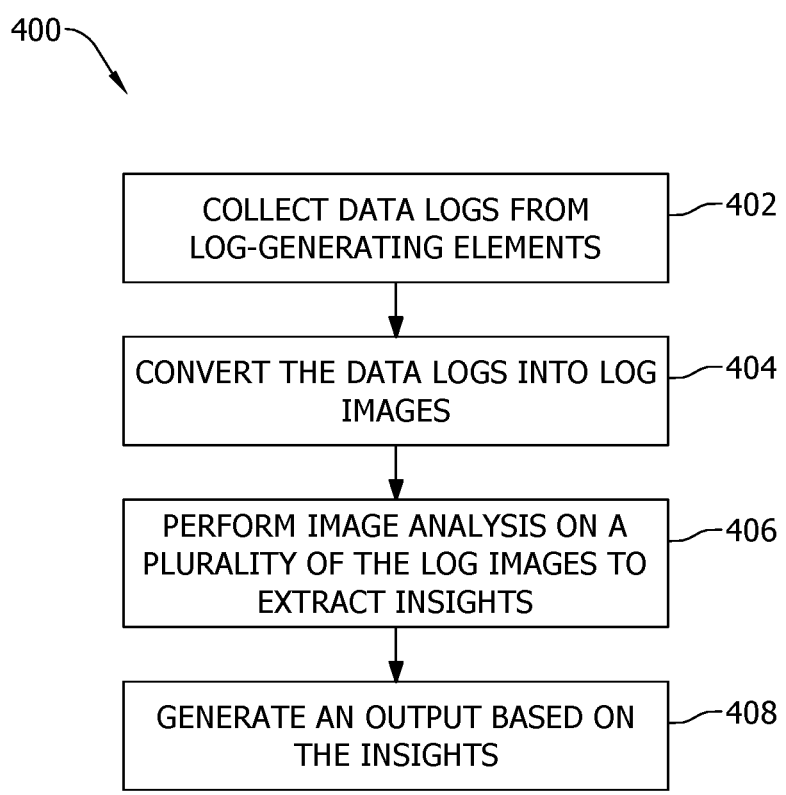
FIG. 4 is a flow chart illustrating a method of analyzing data logs in an illustrative embodiment.

FIG. 4 is a flow chart illustrating a method 400 of analyzing data logs in an illustrative embodiment. The steps of method 400 will be described with reference to log analysis system 120 in FIG. 3, but those skilled in the art will appreciate that method 400 may be performed in other systems. The steps of the flow charts described herein are not all inclusive and may include other steps not shown, and the steps may be performed in an alternative order.

For method 400, log collector 304 collects, obtains, or receives a plurality of data logs 112 from one or more log-generating elements 110 (step 402), such as through network interface component 302. FIG. 5 illustrates a data log 112 in an illustrative embodiment. A data log 112 includes a plurality of fields 502 arranged in columns. For example, the fields 502 are shown as an "ID" field, a "mode" field, a "timestamp" field, a "loglevel" field, a "component" field, and a "logline" field, although the fields 502 may vary as desired. Records 504 of a data log 112 are arranged in rows, and include a plurality of log entries 506. The log entries 506 contain the data of the records 504. At least some of the log entries 506 include text-based data (e.g., text descriptors, a text-based message, a string, etc.), so data log 112 may be considered a text-based data log 112.

Log collector 304 may periodically receive the data logs 112 created by log-generating elements 110, such as daily, hourly, weekly, etc. For example, log-generating elements 110 may periodically push the data logs 112 to log collector 304, or to a managing or supervisory element in system 100 may periodically push the data logs 112 to log collector 304. Log collector 304 may receive the data logs 112 in response to an event (e.g., a fault, warning, or error), a problem report or report ticket, etc. Log collector 304 may transmit requests for data logs 112, and log-generating elements 110 may respond by transmitting the data logs 112 to log collector 304. In response to receiving the data logs 112, log collector 304 may store the data logs 112 in data store 310.

In FIG. 4, log converter 306 converts or translates the data logs 112 into log images 320 (step 404). A log image 320 is a digital image generated or computed from a data log 112 where pixel values in the log image 320 represent numeric values from the log entries 506. FIG. 6 illustrates a log image 320 translated from a data log 112 in an illustrative embodiment. Log image 320 comprises pixels 606 arranged in a two-dimensional grid. For example, the upper-left pixel 606 is at location (0,0), and the bottom-right pixel 606 is at location (m,n). Each pixel 606 has an associated pixel value (PXL VAL), which is a numerical value that defines the intensity of the pixel 606. The pixel value may be 2-bits, 4-bits, 8-bits, 24-bits, 32-bits, etc. To convert a data log 112 into a log image 320, log converter 306 may map log entries 506 in data log 112 to pixels 606 in log image 320. Log converter 306 derives, infers, or determines a numeric value from the log entry 506, and assigns the numeric value derived from the log entry 506 as the pixel value for the pixel 606 mapped to that log entry 506. Log converter 306 may do this for each pixel 606 of log image 320 so that a pixel value is assigned to each pixel 606.

In one embodiment, log converter 306 may map each log entry 506 in a data log 112 with a pixel 606 in a log image 320. In other words, the entirety of the data log 112 is represented in the log image 320. In one embodiment, log converter 306 may map a subset of the log entries 506 in a data log 112 with pixels 606 in a log image 320. For example, log converter 306 may divide a data log 112 into segments, and create multiple log images 320 of the data log 112. One particular implementation may be where log converter 306 creates a separate log image 320 for different fields 502 of a data log 112. In another example, log converter 306 may filter the log entries 506 of a data log 112 to identify a desired subset of log entries 506, and map the desired subset of the log entries 506 with pixels 606 in a log image 320.

Log converter 306 may translate the data logs 112 into log images 320 as they are received from log-generating elements 110, or may retrieve the data logs 112 stored in data store 310 and translate the data logs 112. After conversion, log converter 306 stores the log images 320 in data store 310. The data logs 112 may be deleted from data store 310 if desired. Log converter 306 may also store metadata that is associated with or mapped to the log images 320, such as an identifier for a log-generating element 110, a problem associated with a log-generating element 110, the root cause(s) of a problem encountered by a log-generating element 110, solutions applied at a log-generating element 110 (e.g., corrective measures, preventative measures, work-arounds, configuration changes, software fixes, etc.), and/or other data. One technical benefit of representing the data logs 112 as log images 320 is the data included in the data logs 112 is compressed significantly within the log images 320 as compared to the data logs 112. This allows for the storage of a large set of log images 320, and a long history can be maintained for analytics. Another benefit is that private or sensitive information in the data logs 112 is hidden or concealed in the log images 320.

In FIG. 4, image analyzer 308 performs image analysis on a plurality of the log images 320 to extract insights (step 406). Image analysis is a process of extracting meaningful information, inferences, or insights from log images 320 by means of digital image processing techniques. Thus, image analyzer 308 is able to extract information from the original data logs 112 by processing the log images 320 of the data logs 112. Image analyzer 308 may use a variety of algorithms or techniques, such as Structural Similarity Index (SSIM) algorithms, deep learning algorithms (e.g., convolutional neural network (CNN) image analysis algorithms), etc., to correlate log images 320. Image analysis may be used to identify similarities or dissimilarities between log images 320, to identify similar error scenarios or patterns in multiple log images 320, to identify anomalies in or among log images 320, to predict future events based on past log images 320, etc.

Figure 7:
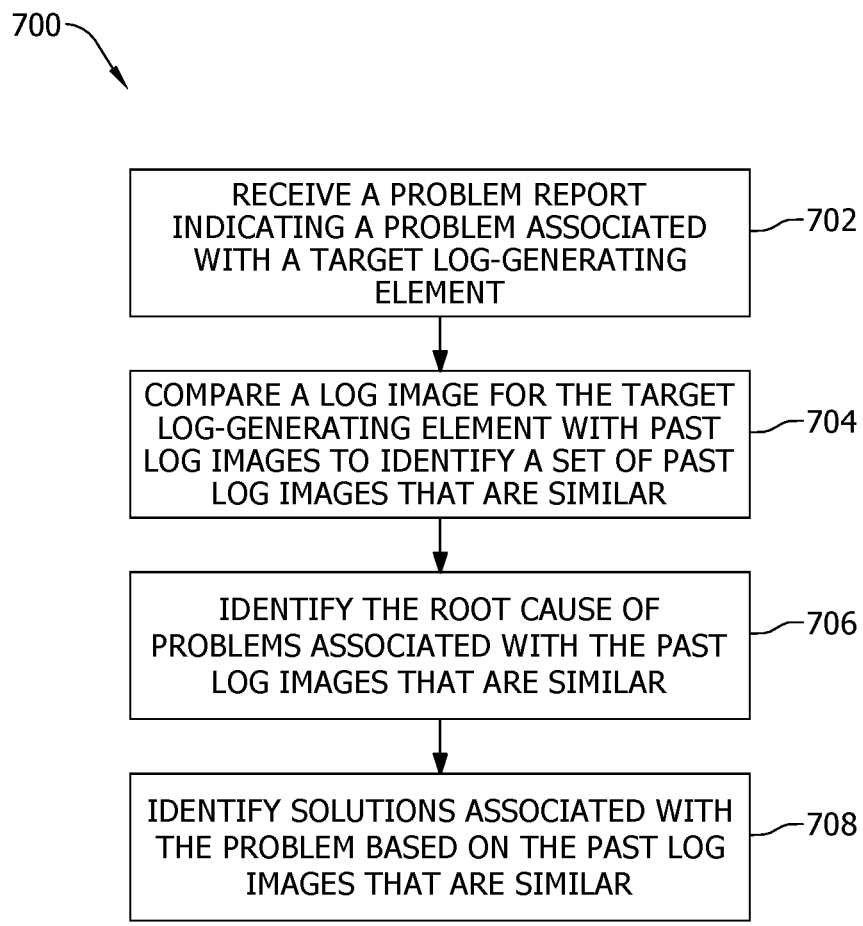
FIG. 7 is a flow chart illustrating a method of analyzing log images in an illustrative embodiment.

FIG. 7 is a flow chart illustrating a method 700 of analyzing log images 320 in an illustrative embodiment. In this embodiment, image analysis may be used for reactive problem management to identify the root cause of a problem (i.e., root cause analysis). For method 700, image analyzer 308 receives a problem report indicating a problem associated with a target log-generating element 110 (step 702). For example, a warning, error, fault, or another problem may be reported for target log-generating element 110. Image analyzer 308 performs image analysis to compare a log image 320 (or multiple log images 320) for the target log-generating element 110 with past log images 320 to identify a set (i.e., one or more) of past log images 320 that are similar to the log image 320 (step 704). For example, image analyzer 308 may compare the pixel values in the log images 320 to identify similar pixel values (e.g., within a threshold) or similar patterns of pixel values. The past log images 320 may be past log images 320 for the target log-generating element 110 and/or past log images 320 for other log-generating elements 110. For the set of past log images 320 that are similar, image analyzer 308 identifies the root cause (or root causes) of problems and/or potential work-arounds associated with the set of past log images 320 (step 706). Image analyzer 308 may also identify one or more solutions (also referred to as troubleshooting solutions or troubleshooting steps) associated with the problem based on the set of past log images 320 (step 708). As noted above, the metadata associated with log images 320 may indicate the root cause(s) of a problem encountered by a log-generating element 110, potential work-arounds, solutions applied at a log-generating element 110 in response to the problem, etc. Thus, by identifying similar past log images 320, image analyzer 308 is able to identify the root cause of a problem and a solution applied at a log-generating element 110 to fix the problem. One technical benefit is the root cause of a problem and a potential solution can be quickly identified with image analysis.

Figure 8:
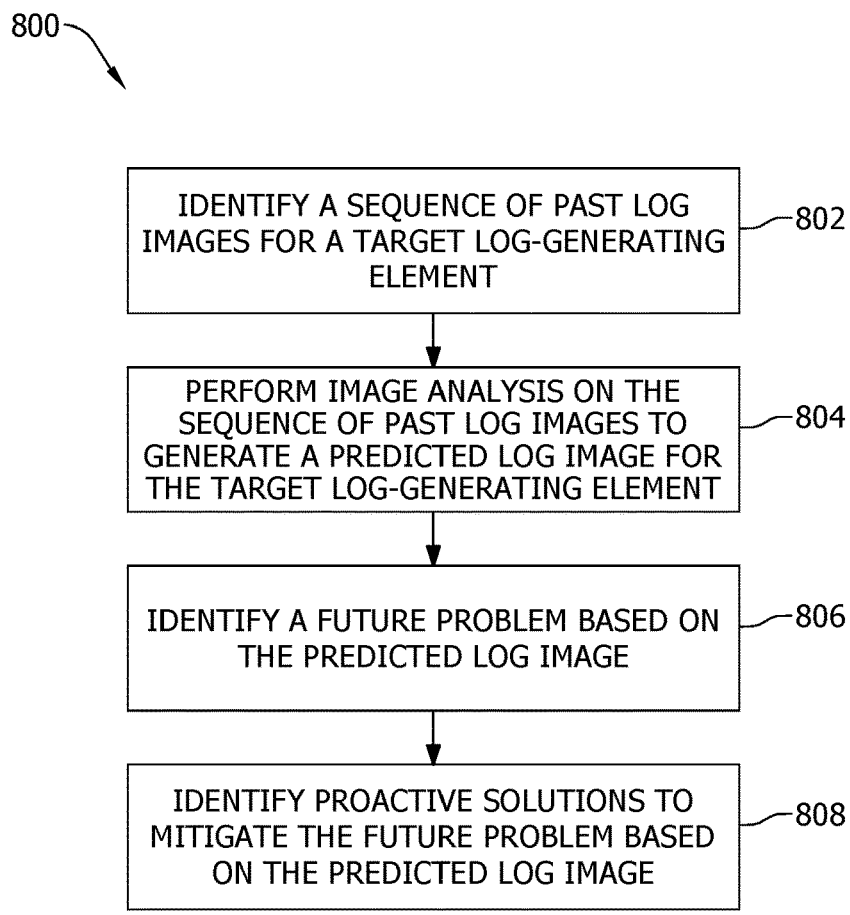
FIG. 8 is a flow chart illustrating another method of analyzing log images in an illustrative embodiment.
Figure 9:
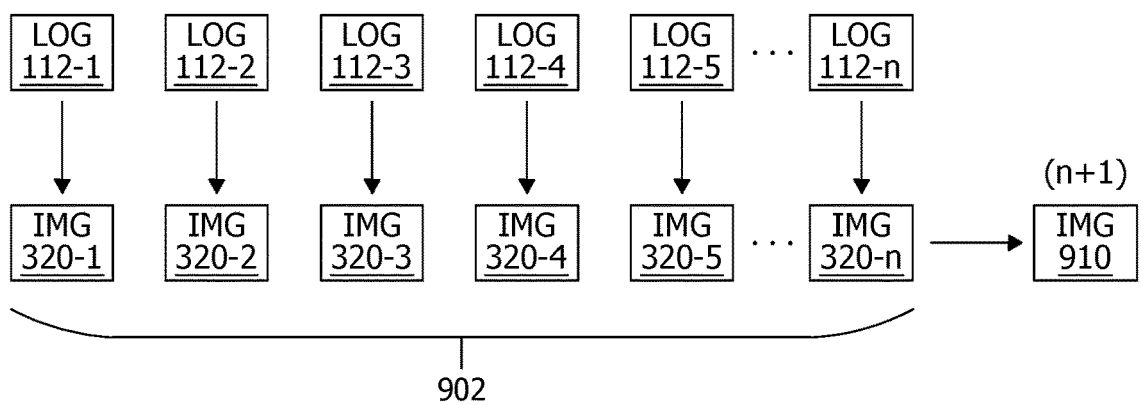
FIG. 9 illustrates proactive problem management using log images in an illustrative embodiment.

FIG. 8 is a flow chart illustrating another method 800 of analyzing log images 320 in an illustrative embodiment. In this embodiment, image analysis may be used for proactive problem management. For example, image analysis may be used to predict error scenarios or problems that could happen in the future. Image analyzer 308 identifies a sequence of past log images 320 for a target log-generating element 110 (step 802). For example, data logs 112 for the target log-generating element 110 may be collected periodically, and a sequence of past log images 320 is created from the periodic data logs 112. Image analyzer 308 performs image analysis on the sequence of past log images 320 to generate a predicted log image (or multiple predicted log images) for the target log-generating element 110 (step 804). FIG. 9 illustrates proactive problem management using log images 320 in an illustrative embodiment. In FIG. 9, log collector 304 periodically receives data logs 112 (i.e., data logs 112-1 through 112-$n$) created by the target log-generating elements 110, such as daily, hourly, monthly, etc. Log converter 306 translates the periodic data logs 112 into log images 320 to form a sequence 902 of past log images 320 (i.e., log images 320-1 through 320-$n$). The past log images 320 in sequence 902 may represent frames of a video indicating the behavior of the target log-generating element 110 over time. The video may be used to predict one or more subsequent frames (i.e., n+1), and hence, predict patterns that could happen in the future. Thus, image analyzer 308 performs image analysis on the sequence 902 of past log images 320 to generate a predicted log image 910 (or multiple predicted log images 910) for the target log-generating element 110 (see step 804). In FIG. 8, image analyzer 308 identifies a future problem based on the predicted log image 910 (step 806). Image analyzer 308 may also identify one or more proactive actions or solutions to mitigate or address the future problem based on the predicted log image 910 (step 808). One technical benefit is that potential errors may be anticipated using image analysis in order to identify and plan risk mitigation steps well in advance.

Image analyzer 308 may perform image analysis in other ways to identify anomalies in log images 320, error patterns, overload conditions, or otherwise extract insights from the log images 320 for troubleshooting, problem management, or the like.

In one embodiment, image analyzer 308 may implement ML system 316 for the image analysis. For example, ML system 316 may build or train ML models based on a set of training data that uses log images 320 or portions of log images 320 as data points. The training data may be based on historical log images 320, based on training data, etc. The ML models may be trained with historic log images 320 for the same problem, from multiple log-generating elements 110, and trained to associate the log images 320 with a given problem or problem definition. When a new log image 320 is given, the ML models can infer whether the problem is same or different. Thus, trainings may include a mapping between log images 320 and problem definitions. Such trainings can help identify an associated problem, given a new log image 320. ML system 316 may then analyze log images 320 using the trained ML models. In one embodiment, visual attention-based mechanisms may be used for identification of known problems within a log image 320. For example, log images 320 are annotated with known problems, and ML models are trained with the annotations and associated log images 320. These ML models can then be applied to identify problems, given a new log image 320 by determining the possible annotations. In one embodiment, Siamese networks measure Euclidean distance (or other such measures) between log images 320, and may be used to perform image analytics on the log images 320.

In FIG. 4, image analyzer 308 generates an output based on the insights (step 408). The output from image analyzer 308 may indicate a variety of information based on the insights extracted from the log images 320. For example, the output may indicate the root cause (or root causes) of a problem, potential work-arounds, and/or a solution to fix a problem. In another example, the output may indicate a future problem and/or a solution or proactive actions to address or mitigate a future problem. The output may be in the form of a message, a record, a report, etc. Image analyzer 308 may transmit the output to another system over a network, such as through network interface component 302. For example, image analyzer 308 may transmit the output to a management system 130 (see FIG. 1) that performs fault management, configuration management, performance management, etc., based on the output. Image analyzer 308 may also display or otherwise provide the output to a product and system development team or the like.

Method 400 as discussed above provides multiple benefits. One benefit is troubleshooting is faster and more efficient in analyzing the log images 320 as compared to analyzing the data logs 112 themselves. Another benefit is the log images 320 are compressed as compared to the data logs 112, and less storage is required. Yet another benefit is private or sensitive information in the data logs 112 is hidden or concealed in the log images 320.

Figure 10:
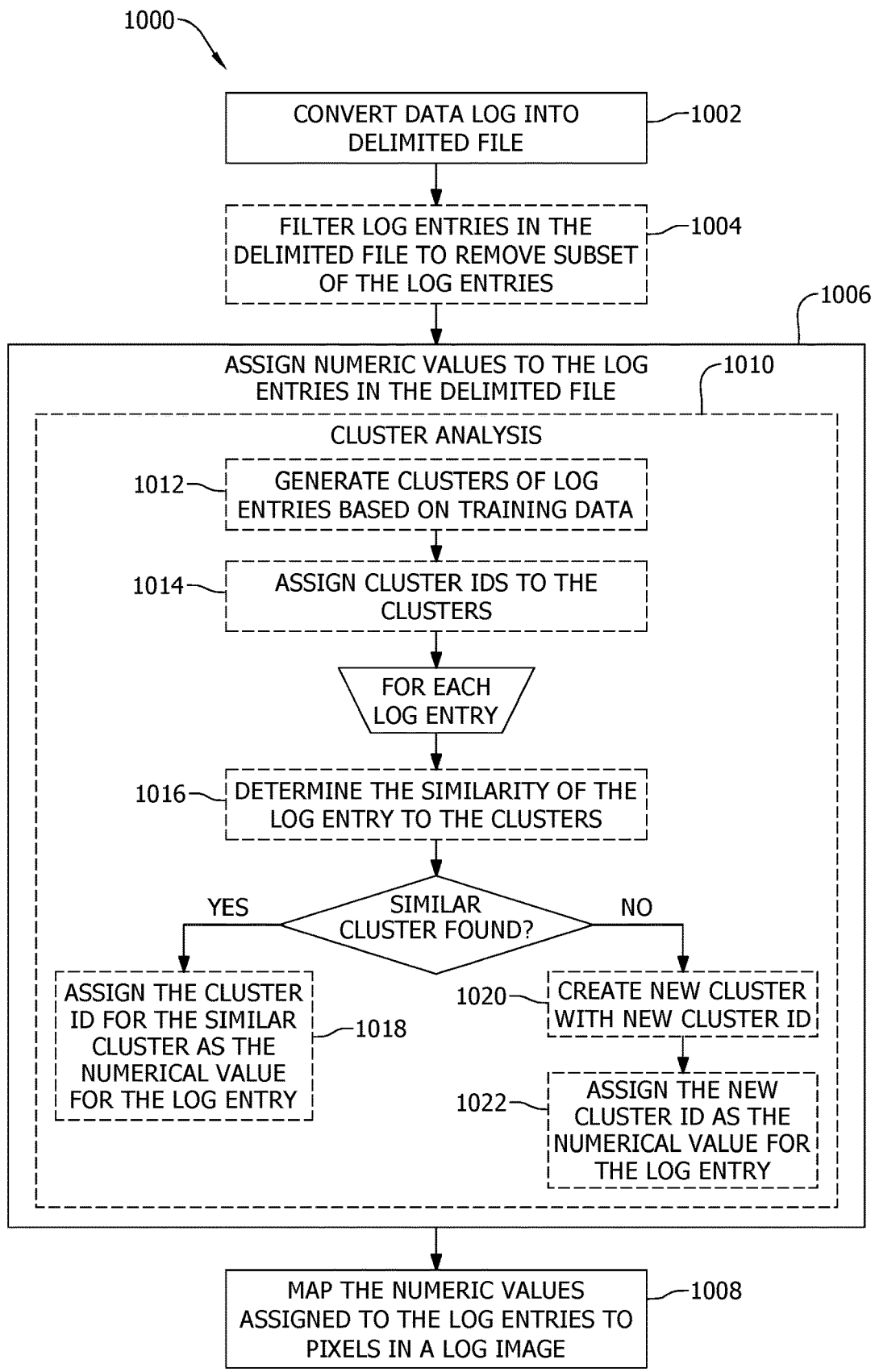
FIG. 10 is a flow chart illustrating a method of converting a data log into a log image in an illustrative embodiment.
Figures 11, 12:
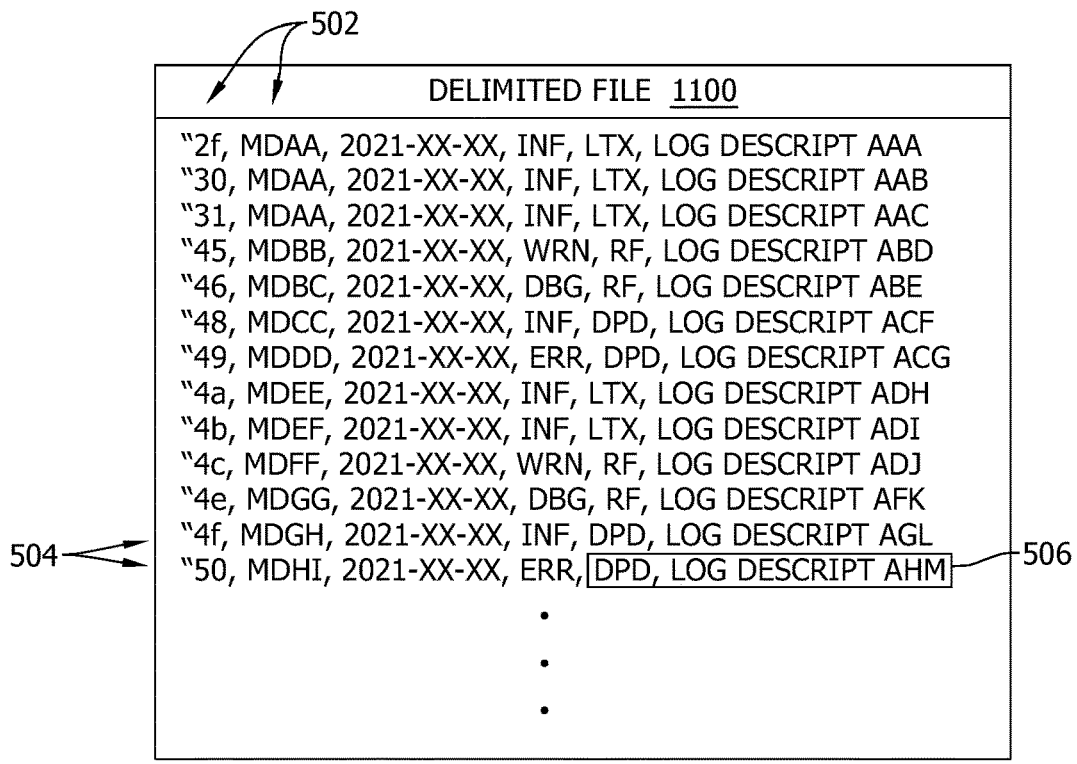
FIG. 11 illustrates a data log converted into a delimited file in an illustrative embodiment.
FIG. 12 illustrates a delimited file indicating numeric values for log entries in an illustrative embodiment.

FIG. 10 is a flow chart illustrating a method 1000 of converting a data log 112 into a log image 320 in an illustrative embodiment, such as in step 404 of FIG. 4. In this embodiment, log converter 306 converts the data log 112 into a delimited file or into delimited format (step 1002). A delimited file is a collection of records arranged in rows, and individual fields are separated by column delimiters within the rows. One example of a delimited file is a comma-separated values (CSV) file, where individual fields are separated by commas within the rows. FIG. 11 illustrates a data log 112 converted into a delimited file 1100 in an illustrative embodiment. In delimited file 1100, records 504 of the data log 112 are arranged in rows, and individual fields 502 are separated by column delimiters (which are commas in this example). Delimited file 1100 thus represents a matrix of log entries 506 from the data log 112.

In FIG. 10, log converter 306 parses the log entries 506 from the delimited file 1100, and assigns numeric values to the log entries 506 (step 1006). Thus, log converter 306 may replace the log entries 506 in delimited file 1100 with the numeric values assigned to the log entries 506, or may create a new delimited file 1100 indicating the numerical values. FIG. 12 illustrates a delimited file 1100 indicating numeric values for the log entries 506 in an illustrative embodiment. Delimited file 1100 has a similar structure as in FIG. 11, except the log entries 506 are replaced with numeric values assigned by log converter 306.

In FIG. 10, log converter 306 maps the numeric values assigned to the log entries 506 to pixels 606 in a log image 320 (step 1008). Thus, log entries 506 in the delimited file 1100 will be mapped to a corresponding pixel 606 in a log image 320, and the numeric values assigned to the log entries 506 represent the pixel values of the pixels 606.

In one embodiment, log converter 306 may map each of the log entries 506 in the delimited file 1100 to a corresponding pixel 606 in a log image 320. In one embodiment, log converter 306 may filter log entries 506 in the delimited file 1100 to remove or mask a subset of the log entries 506 (optional step 1004). Some of the log entries 506 may not be considered as influential or important as others, and these log entries 506 may be masked. For example, log entries 506 reporting information (e.g., "INF" in the loglevel field) may not be considered as influential as log entries 506 reporting faults, errors, warning, etc. (e.g., "DBG", "WRN", "ERR" in loglevel). Log converter 306 may thus parse the log entries 506 from the filtered delimited file 1100, and assign numeric values to the log entries 506 in the filtered delimited file 1100 (see step 1006). When log converter 306 maps the numeric values assigned to the log entries 506 to pixels 606 in the log image 320 (see step 1008), the pixels 606 in the log image 320 will represent the unmasked log entries 506 originally appearing in the data log 112.

Figure 13:
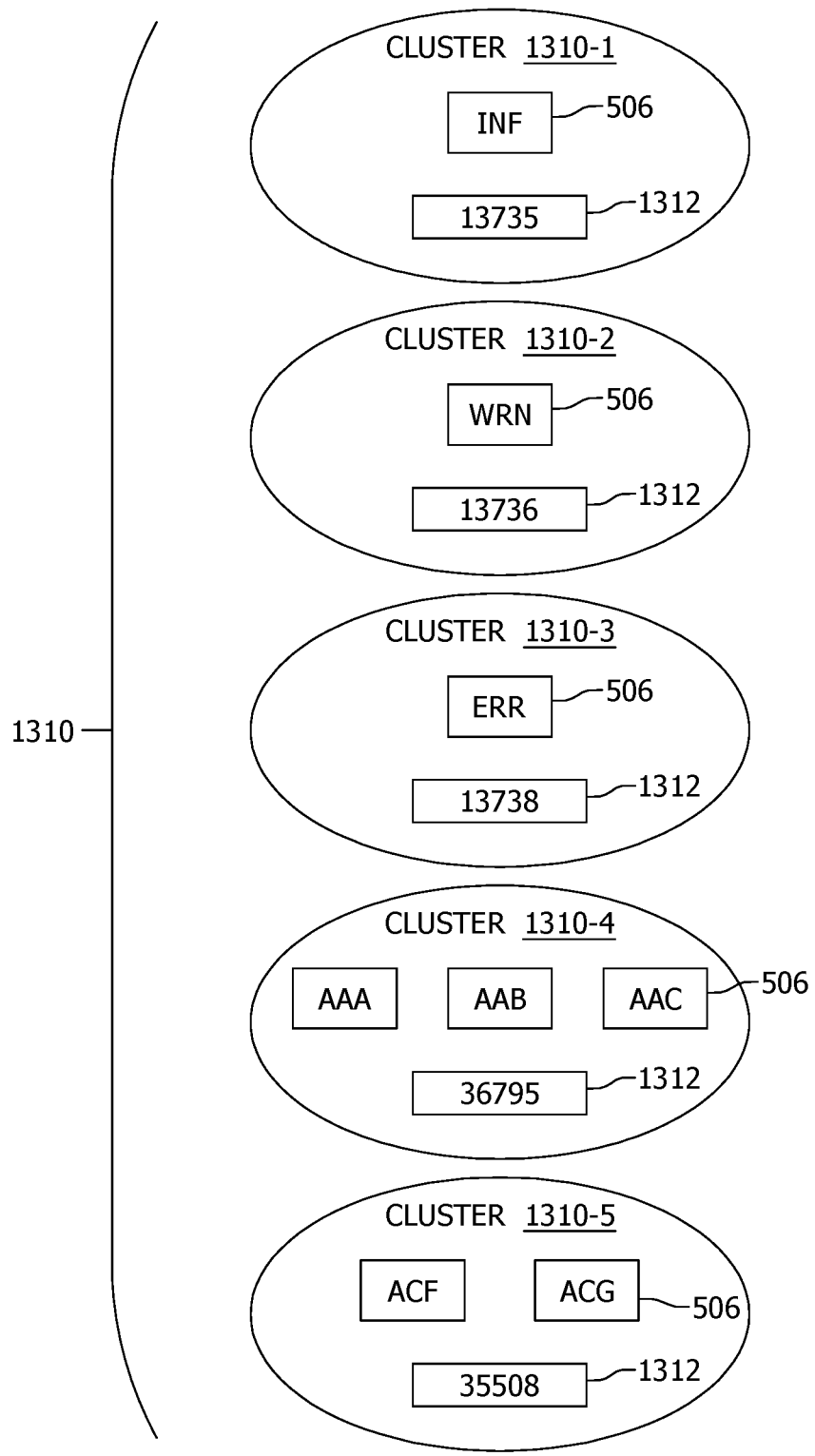
FIG. 13 illustrates clustering of log entries in an illustrative embodiment.

In one embodiment, log converter 306 may use cluster analysis or a clustering algorithm to assign numeric values to the log entries 506 (optional step 1010). With cluster analysis or a clustering algorithm, one or more log entries 506 are grouped into clusters based on the similarity of the log entries 506, and a cluster identifier (ID) is assigned to each of the clusters. FIG. 13 illustrates clustering of log entries 506 in an illustrative embodiment. In this example, a plurality of clusters 1310 are shown. Each cluster 1310 is a grouping of one or more log entries 506 that are similar. For example, cluster 1310-1 is a grouping of one log entry 506 "INF", and is assigned a cluster ID 1312 of "13735". Cluster 1310-2 is a grouping of one log entry 506 "WRN", and is assigned a cluster ID 1312 of "13736". Cluster 1310-3 is a grouping of one log entry 506 "ERR", and is assigned a cluster ID 1312 of "13738". Cluster 1310-4 is a grouping of multiple log entries 506 "AAA", "AAB", and "AAC" that have similar characteristics, and is assigned a cluster ID 1312 of "36795". Cluster 1310-5 is a grouping of multiple log entries 506 "ACF" and "ACG" that have similar characteristics, and is assigned cluster ID 1312 of "35508". The clusters 1310 as shown in FIG. 13 are provided merely as an example, and other types of clustering is considered herein.

For clustering analysis in FIG. 10, ML system 316 may generate clusters 1310 of log entries 506 (i.e., one or more) based on training data (optional step 1012), and assign cluster IDs to the clusters 1310 (optional step 1014). For example, ML system 316 may build or train ML models (e.g., connectivity models, centroid models, etc.) based on a set of training data that uses log entries 506 as data points. The training data may be based on historical data logs 112, based on training data, etc. ML system 316 may then parse the delimited file 1100 using the trained ML models as follows. For a log entry 506 in the delimited file 1100, ML system 316 may determine the similarity of the log entry 506 to the clusters 1310 (optional step 1016), such as based on the ML models. When ML system 316 identifies a similar cluster 1310 to the log entry 506 (i.e., the similarity between the log entry 506 and the cluster 1310 satisfies a threshold (e.g., confidence value)), ML system 316 assign assigns the cluster ID for the similar cluster 1310 as the numerical value for the log entry 506 (optional step 1018). When ML system 316 fails to identify a similar cluster 1310 to the log entry 506 (i.e., the similarity between the log entry 506 and each of the clusters 1310 fails to satisfy the threshold), ML system 316 creates a new cluster 1310 with a new cluster ID (optional step 1020) and assigns the new cluster ID for the new cluster 1310 as the numerical value for the log entry 506 (optional step 1022). ML system 316 may repeat this process for each log entry 506 in the delimited file 1100 so that the log entries 506 are replaced with the cluster IDs. In essence, ML system 316 performs "clustering with memory", as the clustering algorithm "remembers" the cluster IDs that were assigned to prior log entries (e.g., in the training data) so that the same cluster ID is applied to similar log entries 506 in the delimited file 1100.

Figure 14:
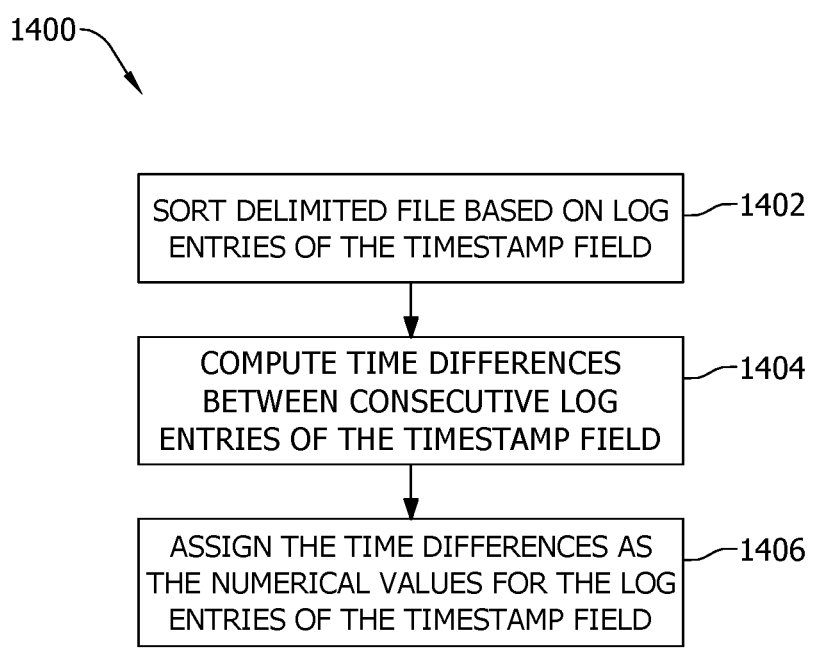
FIG. 14 is a flow chart illustrating a method of assigning numeric values to log entries of a timestamp field in an illustrative embodiment.

In one embodiment, the data log 112 may include a "timestamp" field 502 that indicates a timestamp of a record 504 in the data log 112. When assigning numeric values to the log entries 506 of a timestamp field 502 (see step 1006), log converter 306 may handle the timestamp field 502 in a different manner (i.e., other than clustering). FIG. 14 is a flow chart illustrating a method 1400 of assigning numeric values to the log entries 506 of a timestamp field 502 in an illustrative embodiment. Log converter 306 sorts the delimited file 1100 based on the log entries 506 of the timestamp field 502 (step 1402). Log converter 306 computes or calculates time differences between consecutive log entries 506 of the timestamp field 502 (step 1404). For example, log converter 306 extracts the initial timestamp from the timestamp field 502, and computes the delta (e.g., microseconds) between each consecutive timestamp. Log converter 306 then assigns the time differences as the numerical values for the log entries 506 of the timestamp field 502 (step 1406). The initial timestamp may be used as the filename of the corresponding log image 320 when stored.

Figure 15:
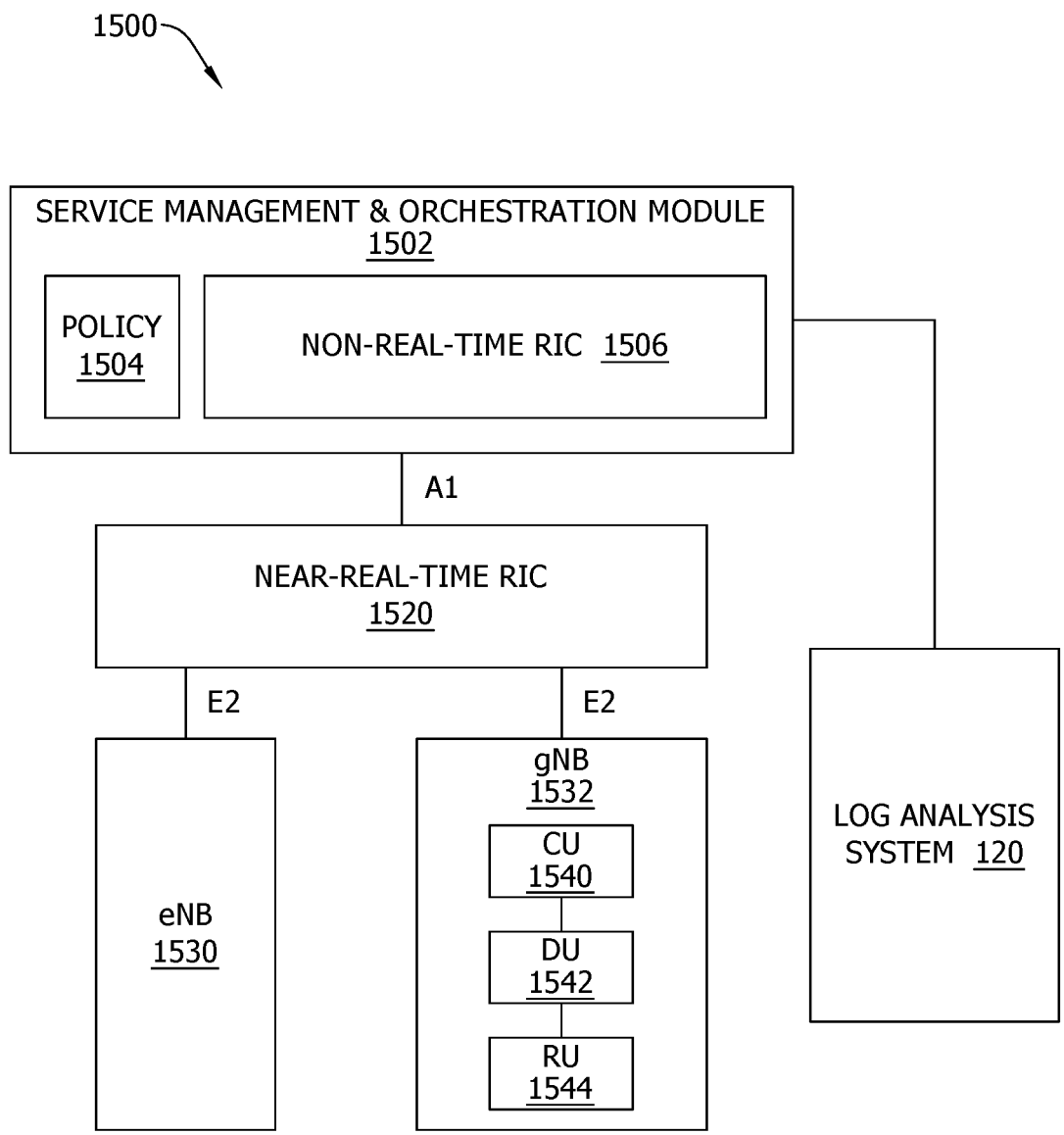
FIG. 15 is a block diagram of an open-RAN (O-RAN) compliant RAN architecture in an illustrative embodiment.

One particular implementation of system 100 may be in a telecommunication system, or more particularly, in a RAN of a telecommunication system. FIG. 15 is a block diagram of an open-RAN (O-RAN) compliant RAN architecture 1500 in an illustrative embodiment. O-RAN is an evolution of a Next Generation RAN (NG-RAN) architecture, such as provided by the 3GPP in TS 38.401 (v. 16.8.0), which is incorporated by reference as if fully provided herein. RAN architecture 1500 includes a Service Management and Orchestration (SMO) module 1502 configured to manage network functions. SMO module 1502 includes policy control function 1504 and a non-real-time RAN Intelligent Controller (RIC) 1506, which is a logical function that enables non-real-time control and optimization of RAN elements and resources, Artificial Intelligence (AI)/ML workflow including model training and updates, and policy-based guidance of applications/features.

RAN architecture 1500 further includes a near-real time RIC 1520, which is a logical function that enables near-real-time control and optimization of O-RAN elements and resources via fine-grained data collection and actions. RAN architecture 1500 further includes an eNB 1530 and a gNB 1532. In this example, gNB 1532 includes a gNB Central Unit (gNB CU) 1540 (may also be referred to as an O-RAN Central Unit (O-CU)), which is a logical node that includes the gNB functions like transfer of user data, mobility control, radio access network sharing, positioning, session management, etc. The gNB CU 1540 may host Radio Resource Control (RRC), Service Data Adaption Protocol (SDAP), and Packet Data Convergence Protocol (PDCP) of a gNB 1532, or RRC and PDCP of the en-gNB that controls the operation of one or more gNB Distributed Units (gNB DUs). Although not shown, gNB CU 1540 may be comprised of a CU-CP, which is a logical node hosting the RRC and the control plane part of the PDCP protocol of the gNB CU 1540 for an en-gNB or a gNB 1532, and a CU-UP, which is a logical node hosting the user plane part of the PDCP protocol of the gNB CU 1540 for an en-gNB, and the user plane part of the PDCP protocol and the SDAP protocol of the gNB CU 1540 for a gNB 1532.

RAN architecture 1500 further includes a gNB Distributed Unit (gNB DU) 1542 (may also be referred to as an O-RAN Distributed Unit (O-DU)), which is a logical node that includes a subset of the gNB functions, depending on the functional split option, and its operation is controlled by the gNB CU 1540. The gNB DU 1542 may host Radio Link Control (RLC), Medium Access Control (MAC), and Physical (PHY) layers of the gNB 1532 or en-gNB. RAN architecture 1500 further includes a gNB Radio Unit (gNB RU) 1544, which is a logical node hosting Low-PHY layer and Radio Frequency (RF) processing based on a lower layer functional split.

In one embodiment, log analysis system 120 may be implemented as an element of RAN architecture 1500, as shown in FIG. 15. In one embodiment, log analysis system 120 as described above may be implemented in non-real-time RIC 1506 or in other elements of RAN architecture 1500.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof

What is claimed is:

1. A method of analyzing data logs, the method comprising:
    collecting a plurality of the data logs from log-generating elements;
    converting the data logs into log images;
    performing image analysis on a plurality of the log images by:
        receiving a problem report indicating a problem associated with a target log-generating element;
        performing the image analysis to compare a log image for the target log-generating element with past log images to identify a set of the past log images that are similar to the log image;
        identifying a root cause of a problem associated with the set of the past log images; and
        identifying one or more solutions applied in response to the problem associated with the set of past log images; and
    generating an output indicating the one or more solutions.

2. The method of claim 1 wherein converting the data logs into log images comprises:
    converting a data log into a delimited file, wherein log entries of the data log are separated by delimiters;
    assigning numeric values to the log entries in the delimited file; and
    mapping the numeric values for the log entries to pixels in a log image, wherein the numeric values represent pixel values for the pixels.

3. The method of claim 2 wherein converting the data logs into log images further comprises:
    filtering the log entries in the delimited file to mask a subset of the log entries.

4. The method of claim 2 wherein assigning numeric values to the log entries comprises:
    generating clusters of log entries based on training data that at least includes portions of past log images as data points;
    assigning cluster identifiers to the clusters;
    for a log entry of the log entries,
        determining a similarity of the log entry to the clusters; and
        assigning, when a similar cluster is identified from the clusters, a cluster identifier for the similar cluster as a numerical value for the log entry.

5. The method of claim 4 wherein when a similar cluster is not identified from the clusters, the method further comprises:
    creating a new cluster with a new cluster identifier; and
    assigning the new cluster identifier for the new cluster as the numerical value for the log entry.

6. The method of claim 4 wherein assigning numeric values to the log entries comprises:
    sorting the delimited file based on the log entries of a timestamp field;
    computing time differences between consecutive log entries of the timestamp field; and
    assigning the time differences as the numerical values for the log entries of the timestamp field.

7. The method of claim 1 wherein:
    the log-generating elements comprise radio access network nodes.

8. A log analysis system, comprising:
    at least one processor; and
    at least one memory including computer program code;
    the at least one memory and the computer program code configured to, with the at least one processor, cause the log analysis system at least to:
        collect a plurality of data logs from log-generating elements;
        convert the data logs into log images;
        perform image analysis on a plurality of the log images by:
            receiving a problem report indicating a problem associated with a target log-generating element;
            performing the image analysis to compare a log image for the target log-generating element with past log images to identify a set of the past log images that are similar to the log image;
            identifying a root cause of a problem associated with the set of the past log images; and
            identifying one or more solutions applied in response to the problem associated with the set of past log images; and
        generate an output indicating the one or more solutions.

9. The log analysis system of claim 8 wherein the at least one memory and the computer program code are configured to, with the at least one processor, further cause the log analysis system at least to:
- convert a data log into a delimited file, wherein log entries of the data log are separated by delimiters;
- assign numeric values to the log entries in the delimited file; and
- map the numeric values for the log entries to pixels in a log image, wherein the numeric values represent pixel values for the pixels.

10. The log analysis system of claim 9 wherein the at least one memory and the computer program code are configured to, with the at least one processor, further cause the log analysis system at least to:
- filter the log entries in the delimited file to mask a subset of the log entries.

11. The log analysis system of claim 9 wherein the at least one memory and the computer program code are configured to, with the at least one processor, further cause the log analysis system at least to:
- generate clusters of log entries based on training data that at least includes portions of past log images as data points;
- assign cluster identifiers to the clusters;
- for a log entry of the log entries,
  - determine a similarity of the log entry to the clusters; and
  - assign, when a similar cluster is identified from the clusters, a cluster identifier for the similar cluster as a numerical value for the log entry.

12. The log analysis system of claim 11 wherein the at least one memory and the computer program code are configured to, with the at least one processor, further cause the log analysis system at least to:
- when a similar cluster is not identified from the clusters, create a new cluster with a new cluster identifier; and
- assign the new cluster identifier for the new cluster as the numerical value for the log entry.

13. The log analysis system of claim 11 wherein the at least one memory and the computer program code are configured to, with the at least one processor, further cause the log analysis system at least to:
- sort the delimited file based on the log entries of a timestamp field;
- compute time differences between consecutive log entries of the timestamp field; and
- assign the time differences as the numerical values for the log entries of the timestamp field.

14. The log analysis system of claim 8 wherein:
- the log-generating elements comprise radio access network nodes.

15. A method of analyzing data logs, the method comprising:
- collecting a plurality of the data logs from log-generating elements;
- converting the data logs into log images;
- performing image analysis on a plurality of the log images by:
  - identifying a sequence of past log images for a target log-generating element;
  - performing the image analysis on the sequence of past log images to generate a predicted log image for the target log-generating element;
  - identifying a future problem based on the predicted log image; and
  - identifying one or more proactive actions to mitigate the future problem based on the predicted log image; and
- generating an output indicating the one or more proactive actions.

16. The method of claim 15 wherein converting the data logs into log images comprises:
- converting a data log into a delimited file, wherein log entries of the data log are separated by delimiters;
- assigning numeric values to the log entries in the delimited file; and
- mapping the numeric values for the log entries to pixels in a log image, wherein the numeric values represent pixel values for the pixels.

17. The method of claim 16 wherein assigning numeric values to the log entries comprises:
- generating clusters of log entries based on training data that at least includes portions of past log images as data points;
- assigning cluster identifiers to the clusters;
- for a log entry of the log entries,
  - determining a similarity of the log entry to the clusters; and
  - assigning, when a similar cluster is identified from the clusters, a cluster identifier for the similar cluster as a numerical value for the log entry.

18. A log analysis system, comprising:
- at least one processor; and
- at least one memory including computer program code;
- the at least one memory and the computer program code configured to, with the at least one processor, cause the log analysis system at least to:
  - collect a plurality of data logs from log-generating elements;
  - convert the data logs into log images;
  - perform image analysis on a plurality of the log images by:
    - identifying a sequence of past log images for a target log-generating element;
    - performing the image analysis on the sequence of past log images to generate a predicted log image for the target log-generating element;
    - identifying a future problem based on the predicted log image; and
    - identifying one or more proactive actions to mitigate the future problem based on the predicted log image; and
  - generate an output indicating the one or more proactive actions.

19. The log analysis system of claim 18 wherein the at least one memory and the computer program code are configured to, with the at least one processor, further cause the log analysis system at least to:
- convert a data log into a delimited file, wherein log entries of the data log are separated by delimiters;
- assign numeric values to the log entries in the delimited file; and
- map the numeric values for the log entries to pixels in a log image, wherein the numeric values represent pixel values for the pixels.

20. The log analysis system of claim 19 wherein the at least one memory and the computer program code are configured to, with the at least one processor, further cause the log analysis system at least to:
- generate clusters of log entries based on training data that at least includes portions of past log images as data points;

assign cluster identifiers to the clusters;
for a log entry of the log entries,
   determine a similarity of the log entry to the clusters; and
   assign, when a similar cluster is identified from the clusters, a cluster identifier for the similar cluster as a numerical value for the log entry.

\* \* \* \* \*